(12) United States Patent
Takenaka et al.

(10) Patent No.: US 7,812,066 B2
(45) Date of Patent: Oct. 12, 2010

(54) BIODEGRADABLE RESIN COMPOSITION

(75) Inventors: Akira Takenaka, Wakayama (JP);
Hiroaki Kishimoto, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 12/442,814

(22) PCT Filed: Oct. 11, 2007

(86) PCT No.: PCT/JP2007/070305

§ 371 (c)(1),
(2), (4) Date: May 11, 2009

(87) PCT Pub. No.: WO2008/044796

PCT Pub. Date: Apr. 17, 2008

(65) Prior Publication Data

US 2010/0063177 A1    Mar. 11, 2010

(30) Foreign Application Priority Data

Oct. 11, 2006  (JP) .............................. 2006-277121
Dec. 19, 2006  (JP) .............................. 2006-340705

(51) Int. Cl.
*C08K 5/34*      (2006.01)
*C08K 5/10*      (2006.01)
*C08K 5/5317*    (2006.01)
*D06P 1/52*      (2006.01)

(52) U.S. Cl. ...................... 523/124; 524/100; 524/140; 524/148; 524/161; 524/201; 524/211; 524/398

(58) Field of Classification Search ................ 523/124; 524/100, 140, 148, 161, 211, 201, 398
See application file for complete search history.

(56) References Cited

U.S. PATENT DOCUMENTS 7,445,835 B2 * 11/2008 Serizawa et al. ......... 428/297.4

| 2004/0152810 A1 | 8/2004 | Takenaka et al. |
| 2005/0001349 A1 | 1/2005 | Yosimura et al. |
| 2005/0228077 A1 | 10/2005 | Alger et al. |

FOREIGN PATENT DOCUMENTS

| JP | 2002-146170 A | 5/2002 |
| JP | 3410075 B2 | 5/2003 |
| JP | 2004-176044 A | 6/2004 |
| JP | 2005-120237 A | 5/2005 |
| JP | 2006-176747 A | 7/2006 |
| JP | 2007-130894 A | 5/2007 |
| WO | WO-03/042302 A1 | 5/2003 |
| WO | WO-2005/097894 A1 | 10/2005 |

* cited by examiner

*Primary Examiner*—Kriellion A Sanders
(74) *Attorney, Agent, or Firm*—Birch, Stewart, Kolasch & Birch, LLP

(57) ABSTRACT

The invention relates to a biodegradable resin composition containing a biodegradable resin, a plasticizer and a crystal nucleus agent, the plasticizer being a compound containing two or more ester groups in the molecule thereof, wherein at least one alcohol component constituting the ester contains an alkylene oxide having 2 to 3 carbon atoms, added in the average amount of 0.5 to 5 moles per one hydroxyl group, and the crystal nucleus agent is a mixture of the following crystal nucleus agent (1) and crystal nucleus agent (2); the crystal nucleus agent (1) being the following crystal nucleus agent (1-1) or crystal nucleus agent (1-2): crystal nucleus agent (1-1): at least one selected from compounds having a hydroxyl group and an amide group in the molecule thereof; and crystal nucleus agent (1-2): at least one selected from hydroxy fatty acid esters; crystal nucleus agent (2): at least one selected from a metal salt of phenylphosphonic acid, a metal salt of a phosphate, a metal salt of an aromatic dialkyl sulfonate, a metal salt of rosinic acids, an aromatic carboxylic acid amide, rosinic acid amide, carbohydrazides, N-substituted ureas, salts of melamine compounds and uracils.

6 Claims, No Drawings

BIODEGRADABLE RESIN COMPOSITION

FIELD OF THE INVENTION

The present invention relates to a biodegradable resin composition.

BACKGROUND OF THE INVENTION

General-purpose resins such as a polypropylene and polyvinyl chloride using petroleum as raw materials are used in various fields such as miscellaneous goods for daily use, domestic electric products, car parts, building materials and food package materials owing to their characteristics such as good processability and durability. However, when these resin products are scrapped after they perform their duties, the high durability of these resin products is rather the drawback that they are inferior in degradability in the natural world and there is therefore a possibility that they adversely affect a biosystem.

In order to solve such a problem, biodegradable resins such as copolymers of a polylactic acid/lactic acid and other aliphatic hydroxycarboxylic acids and aliphatic polyesters derived from aliphatic polyhydric alcohols and aliphatic polyvalent carboxylic acids have been developed as resins which are thermoplastic resins and biodegradable.

Among these biodegradable resins, polylactic acid resins are expected to be utilized at present because L-lactic acid is produced in a large amount from saccharides extracted from corns and potatoes by the fermentation method so that it is reduced in cost, and the amount of all carbon oxides to be exhausted is very small because its raw materials are natural field crops and also resins obtained from the lactic acid have the characteristics that they have strong stiffness and high transparency. Therefore, these polylactic acid resins are used in the fields of agricultural civil engineering such as flat yarns, nets and raising seeding pots, window envelopes, shopping bags, compost bags, writing materials and miscellaneous goods. However, in the case of these polylactic acid resins, all of these resins are limited in use to hard molding fields because these resins have fragile, hard and less flexible characteristics. When these resins are molded into films and the like, the obtained products have the problems that they have insufficient flexibility and are whitened when they are bent. This is the reason why these resins are only insufficiently spread in soft or semi-hard fields.

Various methods using a plasticizer are proposed as technologies for applying a polylactic acid resin to soft or semi-hard fields. For example, technologies in which a plasticizer such as tributyl acetylcitrate or diglycerin tetraacetate is added are disclosed. When these plasticizers are each added to a polylactic acid to form a film or sheet by extrusion molding or the like, good flexibility is obtained. However, the resin is remarkably changed in flexibility at a temperature close to the glass transition point (sensitivity to temperature) because the resin is in an amorphous state, and also, remarkably changed seasonally in properties because it has unsatisfactory heat resistance at high temperatures, giving rise to the problem that it is difficult to use the resin under a high-temperature circumstance. In order to solve this problem, a method is proposed in which a polylactic acid is crystallized by adding a crystal nucleus agent such as talc (JP-B 3410075) to thereby improve, for example, the heat resistance of the resin. However, this method poses the problem that the rate of crystallization performed by heat treatment after the resin is molded is insufficient, and when a crystal nucleus agent such as talc is added in a large amount, the transparency of a sheet or film after thermal molding is deteriorated and a plasticizer bleeds in the case of allowing a molded article to stand under a high-temperature and high-humidity environment.

In order to solve these problems, JP-A 2006-176747 discloses a biodegradable resin composition containing an aliphatic compound having two or more groups of at least one selected from an ester group, hydroxyl group and amide group as a crystal nucleus agent in a molecule. Also, WO-A 2005/097894 discloses a polylactic acid resin composition containing a metal salt of a phosphorous compound.

SUMMARY OF THE INVENTION

The present invention relates to a biodegradable resin composition, containing a biodegradable resin, a plasticizer and a crystal nucleus agent, the plasticizer being a compound containing two or more ester groups in the molecule thereof, wherein at least one alcohol component constituting the ester contains an alkylene oxide having 2 to 3 carbon atoms, added in the average amount of 0.5 to 5 moles per one hydroxyl group and the crystal nucleus agent is a mixture of the following crystal nucleus agent (1) and crystal nucleus agent (2).

The crystal nucleus agent (1) is the following crystal nucleus agent (1-1) or crystal nucleus agent (1-2):

Crystal nucleus agent (1-1): at least one selected from compounds having a hydroxyl group and an amide group in the molecule thereof;

Crystal nucleus agent (1-2): at least one selected from hydroxy fatty acid esters.

Crystal nucleus agent (2): at least one selected from a metal salt of phenylphosphonic acid, a metal salt of a phosphate, a metal salt of an aromatic dialkyl sulfonate, a metal salt of rosinic acids, an aromatic carboxylic acid amide, rosinic acid amide, carbohydrazides, N-substituted ureas, salts of melamine compounds and uracils.

DETAILED DESCRIPTION OF THE INVENTION

The conventional composition cannot be sufficiently satisfied in the rate of crystallization yet and it is desired to further improve the rate of crystallization.

The present invention relates to a biodegradable resin composition which has a high rate of crystallization and is superior in heat resistance.

The biodegradable resin composition of the present invention has good a high rate of crystallization, exhibits excellent moldability at a low mold temperature and is superior in heat resistance.

(Biodegradable Resin)

As the biodegradable resin to be used in the present invention, a polyester resin having the biodegradability based on "Aerobic and ultimate degradability and decay test in a controlled aerobic compost condition" in JIS K6953 (ISO 14855) is preferable.

As the biodegradable resin to be used in the present invention, any resin may be adopted without any particular limitation as long as it has such a biodegradability that it is decomposed into low-molecular compounds by the participation of microorganisms in the natural world. Examples of the biodegradable resin include aliphatic polyesters such as a polyhydroxybutylate, polycaprolactone, polybutylene succinate, polybutylene succinate/adipate, polyethylene succinate, polylactic acid resin, polymalic acid, polyglycolic acid, polydioxanone and poly(2-oxetanone); aliphatic aromatic copolyesters such as a polybutylene succinate/terephthalate, polybutylene adipate/terephthalate and polytetramethylene adipate/terephthalate; and mixtures of natural polymers such as starch, cellulose, chitin, chitosan, gluten, gelatin, zein, soybean protein, collagen and keratin and the aliphatic polyesters or aliphatic aromatic copolyesters.

Among these resins, a polylactic acid resin is preferable from the point of processability, economy and availability of large quantities of a resin. Here, the polylactic acid resin is a copolymer of a polylactic acid or lactic acid and hydroxycarboxylic acid. Examples of the hydroxycarboxylic acid include glycolic acid, hydroxybutyric acid, hydroxyvaleric acid, hydroxy pentanoic acid, hydroxycaproic acid and hydroxyheptanoic acid. Glycolic acid and hydroxycaproic acid are preferable. The molecular structure of a preferred polylactic acid is constituted of 80 to 100 mol % of any one of a L-lactic acid unit and a D-lactic acid unit and 0 to 20 mol % of an antipode lactic acid. Also, the copolymer of a lactic acid and hydroxycarboxylic acid is constituted of 85 to 100 mol % of any one of a L-lactic acid unit and a D-lactic acid unit and 0 to 15 mol % of a hydroxycarboxylic acid unit. These polylactic acid resins may be obtained by selecting compounds having necessary structures from L-lactic acids, D-lactic acids and hydroxycarboxylic acids as raw materials and by running dehydration polymerization condensation of these components. These resins may be obtained preferably by running ring-opening polymerization of compounds which have necessary structures and are selected from lactide which is a cyclic dimer of lactic acid, glycolide which is a cyclic dimer of glycolic acid and caprolactone. Lactide includes L-lactide which is a cyclic dimer of L-lactic acid, D-lactide which is a cyclic dimer of D-lactic acid, meso-lactide obtained by ring-opening dimerization of D-lactic acid and L-lactic acid and DL-lactide which is a racemic mixture of D-lactide and L-lactide. Any of these lactides may be used in the present invention. However, the main raw material is preferably D-lactide or L-lactide.

The weight average molecular weight of the biodegradable resin is preferably 100,000 or more from the viewpoint of the mechanical properties of a molded article and preferably 400,000 or less from the viewpoint of the fluidity of the resin when the resin is molded.

The weight average molecular weight of the biodegradable resin may be found by gel permeation chromatograph (GPC) in the following conditions: solvent: chloroform, column: high-temperature SEC column (GMHHR-H series) manufactured by Tosoh Corporation, flow rate: 1.0 mL/min, column temperature: 40° C., detector: differential refractive index detector (RI), using styrene having a known molecular weight as a reference to calculate based on the styrene.

Examples of commercially available biodegradable resins include Biomax (trade name, manufactured by Du Pont); Ecoflex (trade name, manufactured by BASF Japan Ltd.); EasterBio (trade name, manufactured by Eastman Chemicals Company); Bionole (trade name, manufactured by Showa Highpolymer K.K.); Materpy (trade name, manufactured by The Nippon Synthetic Chemical Industry Co., Ltd.); Ecoplastic U'z (trade name, manufactured by Toyota Motor Corporation); Raysia (trade name, manufactured by Mitsui Chemicals Inc.); Runale (trade name, manufactured by Nippon Shokubai Co., Ltd.); Novon (trade name, manufactured by Chisso); and Nature works (trade name, manufactured by Nature Works Company).

These products preferably include polylactic acid resin (for example, trade name: Raysia manufactured by Mitsui Chemicals, Inc., trade name: Ecoplastic U'z manufactured by Toyota Motor Corporation and trade name: Nature works manufactured by Nature Works Company).

(Plasticizer)

The plasticizer used in the present invention contains two or more ester groups in its molecule, wherein at least one alcohol component constituting the ester contains an alkylene oxide having 2 to 3 carbon atoms which is added in an average amount of 0.5 to 5 moles per 1 hydroxyl group, preferably contains two or more ester groups in its molecule, wherein the alcohol component constituting the ester contains an alkylene oxide having 2 to 3 carbon atoms which is added in an average amount of 0.5 to 5 moles per 1 hydroxyl group, and is more preferably a polyhydric alcohol ester or a polyvalent carboxylic acid ether ester having two or more ester groups in its molecule, wherein the alcohol component constituting the ester contains ethylene oxide which is added in an average amount of 0.5 to 5 moles per 1 hydroxyl group from the viewpoint of plasticization efficiency. The alcohol component constituting the ester contains an alkylene oxide having 2 to 3 carbon atoms which is added in an average amount of preferably 1 to 4 moles and more preferably 2 to 3 moles per 1 hydroxyl group from the viewpoint of compatibility with the biodegradable resin, plasticization efficiency and anti-volatility. Also, the alkylene oxide is preferably ethylene oxide from the viewpoint of plasticization efficiency. The number of carbons of each of the hydrocarbon groups such as alkyl groups or alkylene groups and specifically, the number of carbons of each of the hydrocarbon groups such as the polyhydric alcohol and polyvalent carboxylic acid contained in the plasticizer is preferably 1 to 8, more preferably 1 to 6 and even more preferably 1 to 4. Also, the number of carbons of the monocarboxylic acid and mono-alcohol constituting the ester compound of the plasticizer is preferably 1 to 8, more preferably 1 to 6, even more preferably 1 to 4 and even more preferably 1 to 2 from the viewpoint of compatibility.

There is no particular limitation to a method of producing the plasticizer to be used in the present invention. However, when the plasticizer used in the present invention is, for example, a polyvalent carboxylic acid ether ester, the plasticizer may be obtained by reacting a saturated dibasic acid having 3 to 5 carbon atoms or its anhydride directly with a polyalkylene glycol monoalkyl ether, or by an ester exchange reaction between a lower alkyl ester of a saturated dibasic acid having 3 to 5 carbon atoms and a polyalkylene glycol monoalkyl ether in the presence of an acid catalyst such as paratoluenesulfonic acid monohydrate and sulfuric acid or a metal catalyst such as dibutyltin oxide. Specifically, for example, a polyethylene glycol monoalkyl ether, a saturated dibasic acid and paratoluenesulfonic acid monohydrate as a catalyst are charged into a reactor such that the ratio of polyethylene glycol monoalkyl ether/saturated dibasic acid/paratoluenesulfonic acid monohydrate=2 to 4/1/0.001 to 0.05 and reacted at a temperature of 100 to 130° C. under normal pressure or reduced pressure in the presence or absence of a solvent such as toluene to dehydrate, whereby the plasticizer of the present invention can be obtained. It is preferable to use a method in which the reaction is run without using a solvent under reduced pressure.

Also, when the plasticizer to be used in the present invention is a polyhydric alcohol ester, for example, an alkylene oxide having 2 to 3 carbon atoms is added to glycerin in an amount of 3 to 9 moles based on 1 mol of glycerin at a temperature of 120 to 160° C. by using an autoclave in the presence of an alkali metal catalyst. 3 moles of acetic acid anhydride is added dropwise to 1 mol of the obtained glycerin alkylene oxide addition product. After the addition of acetic acid anhydride is finished, the mixture is ripened at 110° C. for 2 hours to undergo acetylation. The obtained product is treated under reduced pressure by steam distillation to remove contained acetic acid and unreacted acetic acid anhydride, thereby being able to obtain the plasticizer according to the present invention.

Also, when the plasticizer to be used in the present invention is a hydroxycarboxylic acid ether ester, an alkylene oxide having 2 to 3 carbon atoms is added to a hydroxycarboxylic acid, such as lactic acid, at 120 to 160° C. in the presence of an alkali metal catalyst by using an autoclave in an amount of 2 to 5 moles based on 1 mol of the hydroxycarboxylic acid. 1 mol of acetic acid anhydride is added dropwise at 110° C. to 1 mol of the obtained lactic acid alkylene oxide addition product. After the addition of acetic acid anhydride is finished, the mixture is ripened at 110° C. for 2 hours to undergo acetylation. The obtained product is treated under reduced pressure by steam distillation to remove contained acetic acid and unreacted acetic acid anhydride. Then, a mixture of the obtained product, polyalkylene glycol monoalkyl ether and paratoluenesulfonic acid monohydrate (catalyst) at a blended ratio by mol of 1:1 to 2:0.001 to 0.05 is charged in a reactor and reacted and dehydrated at a temperature of 100 to 130° C. at normal pressure or a reduced pressure in the presence or absence of a solvent such as toluene to obtain a plasticizer of the invention.

If the plasticizer used in the present invention contains two or more ester groups in its molecule, it is superior in compatibility with the biodegradable resin, and the plasticizer preferably contains two to four ester groups in its molecule. Also, if at least one of the alcohol components constituting the ester contains an alkylene oxide having 2 to 3 carbon atoms which is added in an average amount of 0.5 moles or more per 1 hydroxyl group, the plasticizer can impart sufficient plasticity to the biodegradable resin, whereas if a compound to which an alkylene oxide is added in an average amount of 5 moles or less is used, the anti-bleeding effect is improved. Also, the plasticizer used in the present invention can develop good moldability particularly at low molding temperatures when it is combined with a polylactic acid resin having an optical purity of 99% or more though this reason has not been clarified.

The plasticizer used in the present invention is preferably a compound which contains two or more ester groups in its molecule and in which the average added mole number of ethylene oxides is 3 to 9, is more preferably at least one selected from an ester of succinic acid or adipic acid and a polyethylene glycol monomethyl ether and an ester of acetic acid and glycerin or an ethylene oxide addition product of ethylene glycol, and even more preferably an ester of succinic acid or adipic acid and a polyethylene glycol monomethyl ether from the viewpoint of moldability, plasticity and anti-bleeding property.

Zero to 1.5 ester groups on the average among two or more ester groups of the plasticizer used in the present invention may contain an ester group constituted of an aromatic alcohol from the viewpoint of anti-volatility. Since an aromatic alcohol is superior in compatibility with the biodegradable resin to an aliphatic alcohol having the same carbon number, the molecular weight of the plasticizer can be increased while keeping the anti-bleeding property. Zero to 1.2 on the average, preferably 0 to 1, of the ester groups are ester groups constituted of aromatic alcohols from the viewpoint of plasticizing efficiency. Examples of the aromatic alcohol include benzyl alcohol and examples of the plasticizer include a mixture diester of adipic acid and diethylene glycol monomethyl ether/benzyl alcohol (1/1).

The average molecular weight of the plasticizer to be used in the present invention is preferably 250 to 700, more preferably 300 to 600, even more preferably 350 to 550 and even more preferably 400 to 500 from the viewpoint of anti-bleeding property and anti-volatility. The average molecular weight may be found by calculating the saponification value of the plasticizer by the method described in JIS K0070 and by calculating from the saponification value by the following equation.

Average molecular weight=56108×(Number of ester groups)/Saponification value.

The plasticizer to be used in the present invention is more preferably alkyl ether esters of polyhydric alcohols such as an ester of acetic acid and ethylene oxide addition (average 3 to 9 moles) product of glycerin, ester of acetic acid and propylene oxide addition (average 4 to 12 moles) product of diglycerin, ester of acetic acid and ethylene oxide addition (average 4 to 9 moles) product of a polyethylene glycol or esters of polyvalent carboxylic acids and polyethylene glycol monomethyl ethers such as an ester of succinic acid and an ethylene oxide addition (average 2 to 4 moles) product of a polyethylene glycol monomethyl ether, ester of adipic acid and an ethylene oxide addition (average 2 to 3 moles) product of a polyethylene glycol monomethyl ether and ester of 1,3,6-hexanetricarboxylic acid and an ethylene oxide addition (average 2 to 3 moles) product of a polyethylene glycol monomethyl ether from the viewpoint of moldability and impact resistance. An ester of acetic acid and ethylene oxide addition (average 3 to 6 moles) product of glycerin, ester of acetic acid and ethylene oxide addition (average 4 to 6 moles) product of a polyethylene glycol, ester of succinic acid and an ethylene oxide addition (average 2 to 3 moles) product of a polyethylene glycol monomethyl ether, ester of adipic acid and diethylene glycol monomethyl ether and ester of 1,3,6-hexanetricarboxylic acid and diethylene glycol monomethyl ether are even more preferable from the viewpoint of moldability and impact resistance of the biodegradable resin composition and anti-bleeding property of the plasticizer. An ester of succinic acid and triethylene glycol monomethyl ether is particularly preferable from the viewpoint of moldability and impact resistance of the biodegradable resin composition and anti-bleeding property, anti-volatility and anti-irritant odor of the plasticizer.

The ester of the present invention is preferably a fully esterified saturated ester from the viewpoint of sufficiently developing the function as the plasticizer.

Though the reason why the effect of the present invention is improved by the specific plasticizer has not been clarified, the plasticizer is improved in heat resistance and compatibility with the biodegradable resin when the plasticizer is a compound which contains two or more ester groups in its molecule, wherein at least one alcohol component constituting the ester contains an alkylene oxide having 2 to 3 carbon atoms which is added in an average amount of 0.5 to 5 moles per 1 hydroxyl group, and preferably a compound which contains two or more ester groups in its molecule and has a polyoxyethylene chain in which the average added mole number of ethylene oxides is 3 to 9 (preferably further contains a methyl group and preferably two or more methyl groups). Accordingly, the plasticizer is improved in anti-bleeding property and also in the effect of softening the biodegradable resin. It is considered that when the degradable resin is crystallized, the growth rate of the crystal is improved by the improvement in softening of the biodegradable resin. It is considered that, as a result, since the degradable resin maintains flexibility even at a low mold temperature, the crystallization of the biodegradable resin proceeds in a short mold retention time, exhibiting better moldability.

(Crystal Nucleus Agent)

The crystal nucleus agent in the present invention is a mixture of the crystal nucleus agent (1) and the crystal nucleus agent (2).

The crystal nucleus agent (1) is the following crystal nucleus agent (1-1) or: crystal nucleus agent (1-2). The details of each of these nucleus agents will be explained now.

As the crystal nucleus agent (1-1) in the present invention, an aliphatic amide having a hydroxyl group is preferable and an aliphatic amide having two or more hydroxy groups and two or more amide groups in its molecule is more preferable from the viewpoint of improving the rate of crystallization and compatibility with the biodegradable resin. Also, the melting point of the crystal nucleus agent (1-1) is preferably 65° C. or more, more preferably 70 to 220° C. and even more preferably 80 to 190° C. from the viewpoint of improving the dispersibility of the crystal nucleus agent in the kneading process and also improving the rate of crystallization.

Specific examples of the crystal nucleus agent (1-1) include hydroxy fatty acid monoamides such as 12-hydroxystearic acid monoethanolamide and hydroxy fatty acid bisamides such as methylene bis12-hydroxystearic acid amide, ethylene bis12-hydroxystearic acid amide and hexamethylene bis12-hydroxystearic acid amide. Alkylene bishydroxystearic acid amide such as ethylene bis12-hydroxystearic acid amide and hexamethylene bis12-hydroxystearic acid amide are preferable and ethylene bis12-hydroxystearic acid amide is more preferable from the viewpoint of the moldability, heat resistance, impact resistance and anti-blooming property of the biodegradable resin composition.

As the crystal nucleus agent (1-2) in the present invention, hydroxy fatty acid esters in which the fatty acid has 12 to 22 carbon atoms are preferable and hydroxy fatty acid esters having two or more hydroxy groups and two or more ester groups in its molecule are more preferable with the view of improving the rate of crystallization and the compatibility with the biodegradable resin. Also, the melting point of the crystal nucleus agent (1-2) is 65° C. or more and 70° C. to 200° C. from the viewpoint of improving the rate of crystallization. The melting point of the hydroxy fatty acid ester is found from the crystal fusion endothermic peak temperature measured by the heat-up method of the differential scanning calorimetry (DSC) based on JIS-K7121.

Specific examples of the crystal nucleus agent (1-2) include hydroxy fatty acid esters such as 12-hydroxystearic acid triglyceride, 12-hydroxystearic acid diglyceride, 12-hydroxystearic acid monoglyceride, pentaerythritol-mono-12-hydroxystearate, pentaerythritol-di-12-hydroxystearate and pentaerythritol-tri-12-hydroxystearate. 12-hydroxystearic acid triglyceride is preferable from the viewpoint of the moldability, heat resistance, impact resistance and anti-blooming property of the biodegradable resin molded product.

Specific examples of the crystal nucleus agent (2) to be used in the present invention include metal salts of phenylphosphonic acid such as a zinc salt of phenylphosphonic acid; metal salts of phosphates such as sodium-2,2'-methylenebis(4,6-di-t-butylphenyl)phosphate and aluminum bis(2,2'-methylenebis-4,6-di-t-butylphenylphosphate); metal salts of aromatic sulfonic acid dialkyl ester such as dimethyldibarium 5-sulfoisophthalate and dimethyldicalcium 5-sulfoisophthalate; metal salts of rosinic acids such as potassium methyldehydroabietate; aromatic carboxylic acid amides such as tris(t-butylamide) trimesate, m-xylylenebis12-hydroxystearic acid amide and 1,3,5-benzenetricarboxylic acid tricyclohexylamide; rosinic acid amides such as p-xylylenebisrosinic acid amide; carbohydrazides such as decamethylenedicarbonyl-dibenzoylhydrazide; N-substituted ureas such as xylylenebisstearylurea; salts of melamine compounds such as melamine cyanurate; and uracils such as 6-methyluracil.

Among the crystal nucleus agents (2) used in the present invention, a metal salt of phenylphosphonic acid is preferable from the viewpoint of the rate of crystallization. The metal salt of phenylphosphonic acid is a metal salt of a phenylphosphonic acid containing a phenyl group which may have a substituent and a phosphonic group (—PO(OH)$_2$). Examples of the substituent of the phenyl group include an alkyl group having 1 to 10 carbon atoms and alkoxycarbonyl group in which the alkoxy group has 1 to 10 carbon atoms. Specific examples of phenylphosphonic acid include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid and diethoxycarbonylphenylphosphonic acid, and unsubstituted phenylphosphonic acid is preferable.

Examples of the metal salt of phenylphosphonic acid include salts of lithium, sodium, magnesium, aluminum, potassium, calcium, barium, copper, zinc, iron, cobalt or nickel, and a zinc salt is preferable.

The ratio of the crystal nucleus agent (1) to the crystal nucleus agent (2), which are used as a crystal nucleus agent in the present invention, is as follows: crystal nucleus agent (1)/crystal nucleus agent (2) (by weight) is preferably 20/80 to 80/20, more preferably 30/70 to 70/30 and even more preferably 40/60 to 60/40 from the viewpoint of developing the effect of the present invention.

The biodegradable resin composition of the present invention has such a superb effect as to provide a high rate of crystallization and an excellent heat resistance. It is not clear why the outstandingly excellent effect of the present invention can be obtained. It is considered that the biodegradable resin composition of the present invention is characterized by the points that the crystal nucleus agent (1) is dissolved in the presence of a specified plasticizer when the biodegradable resin composition is melt-kneaded and therefore, many crystal nuclei can be produced in the cooling step of molding procedures and that the crystal nucleus agent is superior in the interaction (adsorption ability) with the biodegradable resin since the crystal nucleus agent (2) contains metal ions, amide group, NH group or the like in the compound, and the rate of crystallization is high due to synergetic effects of these points, with the result that the biodegradable resin composition of the present invention produces such a superb effect that excellent heat resistance can be provided.

(Biodegradable Resin Composition)

The biodegradable resin composition of the present invention includes the biodegradable resin, the plasticizer which is a compound containing two or more ester groups in its molecule, wherein at least one alcohol component constituting the ester contains an alkylene oxide having 2 to 3 carbon atoms which is added in an average amount of 0.5 to 5 moles per 1 hydroxyl group, preferably a polyhydric alcohol ester or polyvalent carboxylic acid ether ester having two or more ester groups in its molecule, wherein the alcohol component constituting the ester contains ethylene oxide which is added in an average amount of 0.5 to 5 moles per 1 hydroxyl group, and more preferably a compound which contains two or more ester groups in its molecule, wherein the average added mole number of ethylene oxides is 3 to 9, and the crystal nucleus agent constituted of a mixture of the crystal nucleus agent (1) and the crystal nucleus agent (2) and preferably a metal salt of phenylphosphonic acid. A particularly preferable combination of the biodegradable resin, plasticizer and crystal nucleus agent in the biodegradable resin composition of the present invention is a combination of a polylactic acid resin as the biodegradable resin, an ester of succinic acid and triethylene glycol monomethyl ether as the plasticizer, and a mixture of ethylenebis12-hydroxystearic acid amide as the crystal nucleus agent (1-1) and a zinc salt of phenylphosphonic acid as the crystal nucleus agent (2).

It is also preferable that the biodegradable resin is a polylactic acid resin, the plasticizer is an ester of succinic acid and triethylene glycol monomethyl ether and the crystal nucleus agent is a mixture of 12-hydroxystearic acid triglyceride as the crystal nucleus agent (1-2) and a zinc salt of phenylphosphonic acid as the crystal nucleus agent (2).

The content of the biodegradable resin in the biodegradable resin composition of the present invention is preferably 50% by weight or more and more preferably 70% by weight or more from the viewpoint of attaining the object of the present invention.

The content of the plasticizer in the biodegradable resin composition of the present invention is preferably 5 to 30 parts by weight, more preferably 7 to 30 parts by weight, even more preferably 10 to 30 parts by weight and even more preferably 8 to 30 parts by weight based on 100 parts by weight of the biodegradable resin with the view of obtaining sufficient crystallization rate and impact resistance.

The content of the crystal nucleus agent (1) in the biodegradable resin composition of the present invention is preferably 0.1 to 3 parts by weight, more preferably 0.1 to 2 parts by weight and even more preferably 0.2 to 2 parts by weight based on 100 parts by weight of the biodegradable resin with the view of the effect of the present invention.

The content of the crystal nucleus agent (2) in the biodegradable resin composition of the present invention is preferably 0.1 to 3 parts by weight, more preferably 0.1 to 2 parts by weight and even more preferably 0.2 to 2 parts by weight based on 100 parts by weight of the biodegradable resin with the view of the effect of the present invention.

The biodegradable resin composition of the present invention may further contain a hydrolysis inhibitor besides the plasticizer and the crystal nucleus agent according to the present invention. Examples of the hydrolysis inhibitor include carbodiimide compounds such as a polycarbodiimide compound and monocarbodiimide compound. A polycarbodiimide compound is preferable from the viewpoint of moldability of the biodegradable resin composition and a monocarbodiimide compound is preferable from the viewpoint of heat resistance and impact resistance of the biodegradable resin composition and anti-blooming property of the crystal nucleus agent.

Examples of the polycarbodiimide compound include a poly(4,4'-diphenylmethanecarbodiimide), poly(4,4'-dicyclohexylmethanecarbodiimide), poly(1,3,5-triisopropylbenzene)polycarbodiimide, poly(1,3,5-triisopropylbenzene and 1,5-diisopropylbenzene)polycarbodiimide. Examples of the monocarbodiimide compound include N,N'-di-2,6-diisopropylphenylcarbodiimide.

The carbodiimide compounds may be used either singly or in combinations of two or more to satisfy the requirements for the moldability, heat resistance and impact resistance of the biodegradable resin composition and for the anti-blooming property of the crystal nucleus agent. Also, the following compounds are available from the market and may be used: Carbodilight LA-1 (trade name, manufactured by Nisshinbo Industries, Inc.) as the poly(4,4'-dicyclohexylmethanecarbodiimide); Stabaksol P and Stabaksol P-100 (trade name, manufactured by Rhein Chemie) as the poly(1,3,5-triisopropylbenzene)polycarbodiimide and poly(1,3,5-triisopropylbenzene and 1,5-diisopropylbenzene)polycarbodiimide and Stabaksol I (trade name, manufactured by Rhein Chemie) as the N,N'-di-2,6-diisopropylphenylcarbodiimide.

The content of the hydrolysis inhibitor in the biodegradable resin composition of the present invention is preferably 0.05 to 3 parts by weight and more preferably 0.1 to 2 parts by weight based on 100 parts by weight of the biodegradable resin from the viewpoint of the moldability of the biodegradable resin composition.

The biodegradable resin composition of the present invention preferably contains an inorganic filler from the viewpoint of further improving the properties such as stiffness. As the inorganic filler used in the present invention, fibrous, plate, granular and powdery fillers which are usually used to reinforce thermoplastic resins may be used. Specific examples of the inorganic filler include fibrous inorganic fillers such as glass fibers, asbestos fibers, carbon fibers, graphite fibers, metal fibers, potassium titanate whiskers, aluminum borate whiskers, magnesium type whiskers, silicon type whiskers, wollastonite, sepiolite, asbestos, slag fibers, sonolite, ellestadite, gypsum fibers, silica fibers, silica/alumina fibers, zirconia fibers, boron nitride fibers, silicon nitride fibers and boron fibers, and plate or granular inorganic fillers such as glass flakes, non-swellable mica, swellable mica, graphite, metal foils, ceramic beads, talc, clay, mica, sericite, zeolite, bentonite, organic denatured bentonite, organic denatured montmorillonite, dolomite, kaolin, micropowder silicic acid, feldspar powder, potassium titanate, silasbaloon, calcium carbonate, magnesium carbonate, barium sulfate, calcium oxide, aluminum oxide, titanium oxide, aluminum silicate, silicon oxide, gypsum, novaculite, dosonite and China clay. Among these inorganic fillers, particularly, carbon fibers, glass fibers, wollastonite, mica, talc and kaolin are preferable. Also, the aspect ratio of a fibrous filler is preferably 5 or more, more preferably 10 or more and even more preferably 20 or more.

The inorganic filler may be coated with or collected by a thermoplastic resin such as an ethylene/vinyl acetate copolymer or an epoxy resin and may also be treated with a coupling agent such as aminosilane or epoxysilane. Also, the amount of the inorganic filler to be formulated is preferably 1 to 100 parts by weight and more preferably 5 to 50 parts by weight based on 100 parts by weight of the biodegradable resin.

The biodegradable resin composition of the present invention may further contain a flame retardant. Specific examples of the flame retardant include halogen type compounds containing bromine or chlorine, antimony compounds such as antimony trioxide, inorganic hydrates (metal hydroxides such as aluminum hydroxide and magnesium hydroxide) and phosphorous compounds. Inorganic hydrates are preferable from the viewpoint of safety.

The biodegradable resin composition of the present invention may contain other resins from the viewpoint of improving material properties such as rigidity, flexibility, heat resistance and durability. Specific examples of these other resins include thermoplastic resins such as a polyethylene, polypropylene, polystyrene, ABS resin, AS resin, acryl resin, polyamide, polyphenylene sulfide, polyether ether ketone, polyester, polyacetal, polysulfone, polyphenylene oxide, polyimide, polyether imide and soft thermoplastic resins such as an ethylene/glycidylmethacrylate copolymer, polyester elastomer, polyamide elastomer, ethylene/propylene terpolymer and ethylene/butene-1 copolymer, and heat curable resins such as a phenol resin, melamine resin, unsaturated polyester resin, silicone resin and epoxy resin. Among these compounds, resins containing bonds including carbonyl groups such as an amide bond, ester bond and carbonate bond are preferable from the viewpoint of the compatibility with the biodegradable resin because these resins tend to have high affinity to the biodegradable resin structurally.

The biodegradable resin composition of the present invention may further contain, besides the compounds, a hindered phenol type or phosphite type antioxidant or hydrocarbon type waxes and a lubricant which is an anionic surfactant. Each content of the antioxidant and lubricant is preferably 0.05 to 3 parts by weight and more preferably 0.1 to 2 parts by weight based on 100 parts by weight of the biodegradable resin.

The biodegradable resin composition of the present invention may further contain, as components other than the compounds, one or two or more usual additives, for example, a ultraviolet absorber (benzophenone type compounds, benzotriazole type compounds, aromatic benzoate type compounds, oxalic acid anilide type compounds, cyanoacrylate type compounds and hindered amine type compounds), heat stabilizer (hindered phenol type compounds, phosphite type compounds and thioether type compounds), antistatic agent, anti-blooming agent, photostabilizer, foaming agent, releasing agent, colorants including dyes and pigments, mildew-proof agent and antibacterial agent to the extent that the object of the present invention is not impaired.

The biodegradable resin composition of the present invention has so high processability that it can be processed at a temperature as low as, for example, 200° C. or less, and therefore also has the advantage that the plasticizer is scarcely decomposed. Therefore, the biodegradable resin composition of the present invention can be molded into a film or sheet and used in various fields. Also, the biodegradable resin composition of the present invention has a high rate of crystallization and can be therefore molded in a short time at a low molding temperature in injection molding.

EXAMPLES

The following examples are to explain the embodiments of the present invention. These embodiments are to explain examples of the present invention. However, these examples are not intended to be limiting of the present invention.

Examples 1-1 to 1-11 using a crystal nucleus agent (1-1) and Examples 2-1 to 2-11 using a crystal nucleus agent (1-2) will be below explained.

Examples 1-1 to 1-9 and Comparative Examples 1-1 to 1-9

As the biodegradable resin composition, each of the products (1A to 1I) of the present invention as shown in Table 1-1 and comparative products (1a to 1i) as shown in Table 1-2 was melt-kneaded at 180° C. for 10 minutes by a kneader (trade name: DS3-20MWB-E, manufactured by Moriyama Manufacturing Co., Ltd.) and then immediately drawn out into a plate about 5 mm in thickness at 80° C. by an 8-inch roll (manufactured by Nippon Roll Seizo Co., Ltd.). The plate was cut into a size of 8 cm×8 cm (length×width) and then, crushed at 40° C. or less by a crusher (trade name: S-20, manufactured by Daiko Seiki Co., Ltd.) to obtain a crushed product of a biodegradable resin composition.

The obtained crushed product was dried at 70° C. at a reduced pressure for one day to reduce the water content to 500 ppm or less.

TABLE 1-1

| | | Biodegradable resin composition [content: ratio by weight] |
|---|---|---|
| Product of the invention | 1A | LACEA H400*[1]/(MeEO3)2SA*[2]/OHC18EB*[3]/PPA-Zn*[4]/PCI*[5] = 100/10/0.5/0.5/1 |
| | 1B | LACEA H400*[1]/(MeEO3)2SA*[2]/OHC18EB*[3]/PPA-Zn*[4]/PCI*[5] = 100/10/0.25/0.25/1 |
| | 1C | LACEA H400*[1]/(MeEO3)2SA*[2]/OHC18EB*[3]/T-1287*[6]/PCI*[5] = 100/10/0.5/0.5/1 |
| | 1D | LACEA H400*[1]/(MeEO3)2SA*[2]/OHC18EB*[3]/SIP2MeBa*[7]/PCI*[5] = 100/10/0.5/0.5/1 |
| | 1E | LACEA H400*[1]/(MeEO3)2SA*[2]/OHC18EB*[3]/BTTCHA*[8]/PCI*[5] = 100/10/0.5/0.5/1 |
| | 1F | LACEA H400*[1]/(MeEO3)2SA*[2]/OHC18EB*[3]/NA-21*[9]/PCI*[5] = 100/10/0.5/0.5/1 |
| | 1G | LACEA H400*[1]/(MeEO3)2SA*[2]/OHC18EB*[3]/6-MeUra*[10]/PCI*[5] = 100/10/0.5/0.5/1 |
| | 1H | LACEA H400*[1]/(MeEO3)2SA*[2]/OHC18EB*[3]/MC-6000*[11]/PCI*[5] = 100/10/0.5/0.5/1 |
| | 1I | LACEA H400*[1]/(MeEO3)2SA*[2]/OHC18EB*[3]/KM-1500*[12]/PCI*[5] = 100/10/0.5/0.5/1 |

TABLE 1-2

| | | Biodegradable resin composition [content: ratio by weight] |
|---|---|---|
| Comparative product | 1a | LACEA H400*[1]/(MeEO3)2SA*[2]/OHC18EB*[3]/PCI*[5] = 100/10/0.5/1 |
| | 1b | LACEA H400*[1]/(MeEO3)2SA*[2]/PPA-Zn*[4]/PCI*[5] = 100/10/0.5/1 |
| | 1c | LACEA H400*[1]/(MeEO3)2SA*[2]/T-1287*[6]/PCI*[5] = 100/10/1/1 |
| | 1d | LACEA H400*[1]/(MeEO3)2SA*[2]/SIP2MeBa*[7]/PCI*[5] = 100/10/1/1 |
| | 1e | LACEA H400*[1]/(MeEO3)2SA*[2]/BTTCHA*[8]/PCI*[5] = 100/10/1/1 |
| | 1f | LACEA H400*[1]/(MeEO3)2SA*[2]/NA-21*[9]/PCI*[5] = 100/10/1/1 |
| | 1g | LACEA H400*[1]/(MeEO3)2SA*[2]/6-MeUra*[10]/PCI*[5] = 100/10/1/1 |

TABLE 1-2-continued

Biodegradable resin composition [content: ratio by weight]

1h LACEA H400*¹/(MeEO3)2SA*²/MC-6000*¹¹/PCI*⁵ = 100/10/1/1
1i LACEA H400*¹/(MeEO3)2SA*²/KM-1500*¹²/PCI*⁵ = 100/10/1/1

*¹Polylactic acid resin (trade name: LACEA H-400, manufactured by Mitsui Chemicals Inc., weight average molecular weight: 142000)
*²Diester of succinic acid and triethylene glycol monomethyl ether (synthetic product)
*³Ethylenebis12-hydroxystearic acid amide (trade name: Slipax H, manufactured by Nippon Kasei Chemical Co., Ltd.)
*⁴Zinc salt of unsubstituted phenylphosphonic acid (trade name: PPA-Zn, manufactured by Nissan Chemical Industries, Ltd.)
*⁵Carbodilite LA-1 (trade name, manufactured by Nisshinbo Industries, Inc.)
*⁶Decamethylenedicarbonyldibenzoylhydrazide (trade name: T-1287, manufactured by Adeka Corporation)
*⁷5-sulfoisophtalic acid dimethyl dibarium (synthetic product)
*⁸1,3,5-benzenetricarboxylic acid tricyclohexylamide (synthetic product)
*⁹Metal salt of a phosphate (trade name: Adekastab NA-21, manufactured by Adeka Coporation)
*¹⁰6-methyluracil (manufactured by Wako Pure Chemical Industries, Ltd., reagent)
*¹¹Melaminecyanurate (trade name: MC-6000, manufactured by Nissan Chemical Industries, Ltd.)
*¹²Metal salt of rosinic acid (trade name: Pinecrystal KM-1500, manufactured by Arakawa Chemical Industries, Ltd.)

Next, the crushed product obtained in this manner was injection-molded by using an injection molding machine (trade name: J75E-D, manufactured by The Japan Steel Works, Ltd.) in which the temperature of the cylinder was kept at 200° C. to measure the mold retention time required for releasing a test piece (flat plate (70 mm×40 mm×3 mm), a columnar test piece (125 mm×12 mm×6 mm) and a columnar test piece (63 mm×12 mm×5 mm)) at the molding temperature shown in Tables 1-3 and 1-4 and the obtained mold retention time was evaluated according to the following standard. The results are shown in Tables 1-3 and 1-4.

<Evaluation Standard for the Mold Retention Time Required for Releasing>

The time passed until it was decided that each test piece was easily taken out without any deformation at the molding temperatures shown in Tables 1-3 and 1-4 was defined as the mold retention time required for releasing. When a time of 240 seconds or more was required as the mold retention time, it was evaluated as non-releasable.

As the rate of melt crystallization of a test piece in the inside of the mold and at the runner part is increased, the mold retention time required for releasing is more shortened.

TABLE 1-3

| | | Resin composition | Mold temperature (° C.) | Mold retention time required for releasing*¹ (sec.) |
|---|---|---|---|---|
| Example | 1-1 | 1A | 80 | 45 |
| | | | 70 | 60 |
| | | | 60 | 60 |
| | 1-2 | 1B | 80 | 45 |
| | | | 70 | 60 |
| | | | 60 | 60 |
| | 1-3 | 1C | 80 | 50 |
| | | | 70 | 70 |
| | | | 60 | 80 |
| | 1-4 | 1D | 80 | 50 |
| | | | 70 | 70 |
| | | | 60 | 80 |
| | 1-5 | 1E | 80 | 50 |
| | | | 70 | 75 |
| | | | 60 | 90 |
| | 1-6 | 1F | 80 | 55 |
| | | | 70 | 80 |
| | | | 60 | 95 |

TABLE 1-3-continued

| | | Resin composition | Mold temperature (° C.) | Mold retention time required for releasing*¹ (sec.) |
|---|---|---|---|---|
| | 1-7 | 1G | 80 | 55 |
| | | | 70 | 80 |
| | | | 60 | 95 |
| | 1-8 | 1H | 80 | 55 |
| | | | 70 | 80 |
| | | | 60 | 95 |
| | 1-9 | 1H | 80 | 55 |
| | | | 70 | 85 |
| | | | 60 | 100 |

*¹Injection pressure time(15 sec.) + cooling time (sec.)

TABLE 1-4

| | | Resin composition | Mold temperature (° C.) | Mold retention time required for releasing *¹ (sec.) |
|---|---|---|---|---|
| Comparative example | 1-1 | 1a | 80 | 60 |
| | | | 70 | 90 |
| | | | 60 | Non-releasable |
| | 1-2 | 1b | 80 | 90 |
| | | | 70 | 120 |
| | | | 60 | Non-releasable |
| | 1-3 | 1c | 80 | 100 |
| | | | 70 | 150 |
| | | | 60 | Non-releasable |
| | 1-4 | 1d | 80 | 100 |
| | | | 70 | 150 |
| | | | 60 | Non-releasable |
| | 1-5 | 1e | 80 | 110 |
| | | | 70 | 160 |
| | | | 60 | Non-releasable |
| | 1-6 | 1f | 80 | 120 |
| | | | 70 | 170 |
| | | | 60 | Non-releasable |
| | 1-7 | 1g | 80 | 130 |
| | | | 70 | 180 |
| | | | 60 | Non-releasable |
| | 1-8 | 1h | 80 | 130 |
| | | | 70 | 180 |
| | | | 60 | Non-releasable |
| | 1-9 | 1i | 80 | 140 |
| | | | 70 | 200 |
| | | | 60 | Non-releasable |

*1 Injection pressure retention time(15 sec.) + cooling time (sec.)

From the results of Tables 1-3 and 1-4, the biodegradable resin compositions (1A to 1I) each containing a specified plasticizer, a specified crystal nucleus agent and further, a hydrolysis inhibitor according to the present invention could be molded even at a mold temperature of 80° C. in a short mold retention time. Moreover, the biodegradable resin compositions (1A and 1B) could be molded even at mold temperatures as low as 70° C. and 60° C. in a short mold retention time.

The biodegradable resin compositions (1a to 1i), each containing the crystal nucleus agent (1-1) or the crystal nucleus agent (2) as the crystal nucleus agent could not be molded at a mold temperature of 80° C. in a short mold retention time. Also, these biodegradable resin compositions (1a to 1i) could not be molded at a mold temperature as low as 70° C. and 60° C. in a short mold retention time.

Examples 1-10 and 1-11, Comparative Examples 1-10 and 1-11

The products (1A and 1B) of the present invention as shown in Table 1-1 and the comparative products (1a and 1b) as shown in Table 1-2 were each used as the biodegradable resin composition to obtain crushed products of biodegradable resin compositions in the same manner as in Example 1-1.

Next, each crushed product obtained in this manner was injection-molded by using an injection molding machine (trade name: J75E-D, manufactured by The Japan Steel Works, Ltd.) at a mold temperature of 80° C. for the mold retention time shown in Table 1-5. The obtained test piece (flat plate (70 mm×40 mm×3 mm) and a columnar test piece (125 mm×12 mm×6 mm)) were subjected to a test to evaluate the mold releasability according to the following standard. Also, the thermal deformation temperature of the columnar test piece (125 mm×12 mm×6 mm) and the degree of crystallization of the flat plate (70 mm×40 mm×3 mm) were respectively evaluated in the following methods. These results are shown in Table 1-5.

<Evaluation Standard for Mold Releasability>

○: Very easily releasable (the test piece is not deformed and is easily taken out)

Δ: Slightly non-releasable (the test piece is slightly deformed and it is difficult to take out the test piece)

x: Non-releasable (the test piece is largely deformed and is not released from the runner portion)

With regard to the mold releasability, the moldability is more improved as the rate of melt-crystallization of the test piece inside of the mold and at the runner part is increased.

<Thermal Deformation Temperature>

The columnar test piece (125 mm×12 mm×6 mm) was subjected to a test using a thermal deformation measuring device (trade name: B-32, manufactured by Toyo Seiki Seisaku-sho, Ltd.) to measure the temperature under a load 0.45 MPa when the test piece was bent by 0.025 mm. It is shown that the heat resistance of the test piece is higher as the temperature is higher.

<Degree of Crystallization>

With regard to the flat plate (70 mm×40 mm×3 mm), the test piece after the injection molding was subjected to a test using a wide-angle X-ray diffraction measuring device (trade name: RINT2500 VPC, light source: CuKα, tube voltage: 40 kV and tube current: 120 mA, manufactured by Rigaku Corporation) to analyze the amorphous and crystal peak area in the angle 2θ range from 5 to 30°, thereby finding the degree of crystallization.

TABLE 1-5

|  |  | Resin composition | Mold temperature (° C.) | Mold retention time (sec.) | Mold releasability | Thermal deformation temperature 0.45 MPa (° C.) | Degree of crystallization (%) |
| --- | --- | --- | --- | --- | --- | --- | --- |
| Example | 1-10 | 1A | 80 | 45 | ○ | 86 | 56.6 |
|  | 1-11 | 1B | 80 | 45 | ○ | 78 | 49.6 |
| Comparative example | 1-10 | 1a | 80 | 60 | ○ | 71 | 50.6 |
|  | 1-11 | 1b | 80 | 90 | ○ | 70 | 50.0 |

From the result of Table 1-5, the biodegradable resin compositions (1A and 1B) containing a specified plasticizer, a specified crystal nucleus agent and further a hydrolysis inhibitor according to the present invention could be molded even at a mold temperature of 80° C. in a short mold retention time, and the molded product was an excellent material exhibiting high heat resistance enough to stand against a temperature of 78° C. or more.

On the other hand, the biodegradable resin compositions (1a and 1b) each using one of the crystal nucleus agent (1-1) and the crystal nucleus agent (2) as the nucleus agent required a long mold retention time at a mold temperature of 80° C. to obtain good molded products. Also, the obtained molded product could not exhibit superior heat resistance.

It is found from the results that the biodegradable resin composition of the present invention which uses a specified plasticizer and a combination of the crystal nucleus agent (1-1) and the crystal nucleus agent (2) as the crystal nucleus agent exhibits excellent moldability at a low mold temperature and that the molded product exhibits excellent heat resistance.

Examples 2-1 to 2-9, Comparative Examples 2-1 and 2-9

The products (2A to 2I) of the present invention as shown in Table 2-1 and the comparative products (2a to 2i) as shown in Table 2-2 were each used as the biodegradable resin composition to obtain crushed products of biodegradable resin compositions in the same manner as in Example 1-1.

The obtained crushed products were respectively dried at 70° C. under reduced pressure for one day to reduce the content of water to 500 ppm or less.

TABLE 2-1

| | Biodegradable resin composition [content: ratio by weight] |
|---|---|
| Product of the invention | 2A LACEA H400*1/(MeEO3)2SA*2/OHC18Gly*3/PPA-Zn*4/PCI*5 = 100/10/0.5/0.5/1 |
| | 2B LACEA H400*1/(MeEO3)2SA*2/OHC18Gly*3/PPA-Zn*4/PCI*5 = 100/10/0.25/0.25/1 |
| | 2C LACEA H400*1/(MeEO3)2SA*2/OHC18Gly*3/T-1287*6/PCI*5 = 100/10/0.5/0.5/1 |
| | 2D LACEA H400*1/(MeEO3)2SA*2/OHC18Gly*3/SIP2MeBa*7/PCI*5 = 100/10/0.5/0.5/1 |
| | 2E LACEA H400*1/(MeEO3)2SA*2/OHC18Gly*3/BTTCHA*8/PCI*5 = 100/10/0.5/0.5/1 |
| | 2F LACEA H400*1/(MeEO3)2SA*2/OHC18Gly*3/NA-21*9/PCI*5 = 100/10/0.5/0.5/1 |
| | 2G LACEA H400*1/(MeEO3)2SA*2/OHC18Gly*3/6-MeUra*10/PCI*5 = 100/10/0.5/0.5/1 |
| | 2H LACEA H400*1/(MeEO3)2SA*2/OHC18Gly*3/MC-6000*11/PCI*5 = 100/10/0.5/0.5/1 |
| | 2I LACEA H400*1/(MeEO3)2SA*2/OHC18Gly*3/KM-1500*12/PCI*5 = 100/10/0.5/0.5/1 |

TABLE 2-2

| | Biodegradable resin composition [content: ratio by weight] |
|---|---|
| Comparative product | 2a LACEA H400*1/(MeEO3)2SA*2/OHC18Gly*3/PCI*5 = 100/10/0.5/1 |
| | 2b LACEA H400*1/(MeEO3)2SA*2/PPA-Zn*4/PCI*5 = 100/10/0.5/1 |
| | 2c LACEA H400*1/(MeEO3)2SA*2/T-1287*6/PCI*5 = 100/10/1/1 |
| | 2d LACEA H400*1/(MeEO3)2SA*2/SIP2MeBa*7/PCI*5 = 100/10/1/1 |
| | 2e LACEA H400*1/(MeEO3)2SA*2/BTTCHA*8/PCI*5 = 100/10/1/1 |
| | 2f LACEA H400*1/(MeEO3)2SA*2/NA-21*9/PCI*5 = 100/10/1/1 |
| | 2g LACEA H400*1/(MeEO3)2SA*2/6-MeUra*10/PCI*5 = 100/10/1/1 |
| | 2h LACEA H400*1/(MeEO3)2SA*2/MC-6000*11/PCI*5 = 100/10/1/1 |
| | 2i LACEA H400*1/(MeEO3)2SA*2/KM-1500*12/PCI*5 = 100/10/1/1 |

*1, *2, *4 to *12 are the same as those described in Table 1-1.
*3 12-hydroxystearic acid triglyceride (trade name: Kao Wax 85P, manufactured by Kao Corporation)

Next, the crushed product obtained in this manner was subjected to a test to evaluate the mold retention time in the same manner as in Example 1-1. Also, the anti-bleeding property of the obtained flat plate (70 mm×40 mm×3 mm) were evaluated in the following method. These results are shown in Tables 2-3 and 2-4.

<Anti-Bleeding Property>

The flat plate (70 mm×40 mm×3 mm) obtained after the injection molding was allowed to stand in a high-temperature and high-humidity condition of 50° C./80% Rh for three months to visually observe whether or not the bleeding of the plasticizer occurred on the surface of the plate.

TABLE 2-3

| | | Resin composition | Mold temperature (° C.) | Mold retention time required for releasing *1 (sec.) | anti-bleeding property 50° C./80% Rh for 3 months |
|---|---|---|---|---|---|
| Example | 2-1 | 2A | 80 | 50 | ○ |
| | | | 70 | 65 | ○ |
| | | | 60 | 65 | ○ |
| | 2-2 | 2B | 80 | 55 | ○ |
| | | | 70 | 65 | ○ |
| | | | 60 | 70 | ○ |
| | 2-3 | 2C | 80 | 65 | ○ |
| | | | 70 | 80 | ○ |
| | | | 60 | 90 | ○ |
| | 2-4 | 2D | 80 | 65 | ○ |
| | | | 70 | 80 | ○ |
| | | | 60 | 90 | ○ |
| | 2-5 | 2E | 80 | 65 | ○ |
| | | | 70 | 90 | ○ |
| | | | 60 | 100 | ○ |
| | 2-6 | 2F | 80 | 70 | ○ |
| | | | 70 | 95 | ○ |
| | | | 60 | 110 | ○ |

TABLE 2-3-continued

| Resin composition | Mold temperature (° C.) | Mold retention time required for releasing *1 (sec.) | anti-bleeding property 50° C./ 80% Rh for 3 months |
|---|---|---|---|
| 2-7 2G | 80 | 70 | ○ |
|  | 70 | 95 | ○ |
|  | 60 | 110 | ○ |
| 2-8 2H | 80 | 70 | ○ |
|  | 70 | 95 | ○ |
|  | 60 | 110 | ○ |
| 2-9 2I | 80 | 70 | ○ |
|  | 70 | 100 | ○ |
|  | 60 | 120 | ○ |

*1: Injection pressure time(15 sec.) + cooling time (sec.)

TABLE 2-4

|  | Resin composition | Mold temperature (° C.) | Mold retention time required for releasing *1 (sec.) | anti-bleeding property 50° C./ 80% Rh for 3 months |
|---|---|---|---|---|
| Comparative example | 2-1 2a | 80 | 85 | ○ |
|  |  | 70 | 120 | ○ |
|  |  | 60 | Non-releasable | ○ |
|  | 2-2 2b | 80 | 90 | ○ |
|  |  | 70 | 120 | ○ |
|  |  | 60 | Non-releasable | ○ |
|  | 2-3 2c | 80 | 100 | ○ |
|  |  | 70 | 150 | ○ |
|  |  | 60 | Non-releasable | ○ |
|  | 2-4 2d | 80 | 100 | ○ |
|  |  | 70 | 150 | ○ |
|  |  | 60 | Non-releasable | ○ |
|  | 2-5 2e | 80 | 110 | ○ |
|  |  | 70 | 160 | ○ |
|  |  | 60 | Non-releasable | ○ |
|  | 2-6 2f | 80 | 120 | ○ |
|  |  | 70 | 170 | ○ |
|  |  | 60 | Non-releasable | ○ |
|  | 2-7 2g | 80 | 130 | ○ |
|  |  | 70 | 180 | ○ |
|  |  | 60 | Non-releasable | ○ |
|  | 2-8 2h | 80 | 130 | ○ |
|  |  | 70 | 180 | ○ |
|  |  | 60 | Non-releasable | ○ |
|  | 2-9 2i | 80 | 140 | ○ |
|  |  | 70 | 200 | ○ |
|  |  | 60 | Non-releasable | ○ |

*1: Injection pressure time(15 sec.) + cooling time (sec.)

From the results of Tables 2-3 and 2-4, the biodegradable resin compositions (2A to 2I) each containing a specified plasticizer, a specified crystal nucleus agent and further, a hydrolysis inhibitor according to the present invention could be molded even at a mold temperature of 80° C. in a short mold retention time. Moreover, the biodegradable resin compositions (2A and 2B) could be molded even at mold temperatures as low as 70° C. and 60° C. in a short mold retention time.

On the other hand, the biodegradable resin compositions (2a to 2i) each using one of the crystal nucleus agent (1-2) and the crystal nucleus agent (2) as the crystal nucleus agent could not be molded at a temperature of 80° C. in a short mold retention time. Also, these biodegradable resin compositions (2a to 2i) could not be molded at a temperature as low as 70° C. and 60° C. in a short mold retention time.

Examples 2-10 and 2-11, Comparative Examples 2-10 and 2-11

The products (2A and 2B) of the present invention as shown in Table 2-1 and the comparative products (2a and 2b) as shown in Table 2-2 were each used as the biodegradable resin composition to obtain crushed products of biodegradable resin compositions in the same manner as in Example 1-1.

Each of the obtained crushed products was treated at a mold temperature of 80° C. for the mold retention time shown in Table 2-5 to evaluate in the same manner as in Example 1-10. These results are shown in Table 2-5.

TABLE 2-5

|  |  | Resin composition | Mold temperature (° C.) | Mold retention time (sec.) | Mold releasability | Thermal deformation temperature 0.45 MPa (° C.) | Degree of crystallization (%) |
|---|---|---|---|---|---|---|---|
| Example | 2-10 | 2A | 80 | 50 | ○ | 82 | 55.2 |
|  | 2-11 | 2B | 80 | 55 | ○ | 77 | 51.2 |
| Comparative example | 2-10 | 2a | 80 | 85 | ○ | 70 | 49.5 |
|  | 2-11 | 2b | 80 | 90 | ○ | 70 | 50.0 |

From the result of Table 2-5, the biodegradable resin compositions (2A and 2B) containing a specified plasticizer, a specified crystal nucleus agent and further a hydrolysis inhibitor according to the present invention could be molded even at a mold temperature of 80° C. in a short mold retention time, and the molded product was an excellent material exhibiting high heat resistance enough to stand against a temperature of 77° C. or more.

On the other hand, the biodegradable resin compositions (2a and 2b) each using one of the crystal nucleus agent (1-2) and the crystal nucleus agent (2) as the nucleus agent required a long mold retention time at a mold temperature of 80° C. to obtain good molded products. Also, the obtained molded product could not exhibit superior heat resistance.

It is found from the results that the biodegradable resin composition of the present invention which uses a specified plasticizer and a combination of the crystal nucleus agent (1-2) and the crystal nucleus agent (2) as the crystal nucleus agent exhibits excellent moldability at a low mold temperature and that the molded product exhibits excellent anti-bleeding property under a high-temperature and high-humidity circumstance and excellent heat resistance.

The invention claimed is:

1. A biodegradable resin composition, comprising a polylactic acid resin, a plasticizer and a crystal nucleus agent, the plasticizer being a compound containing two or more ester groups in the molecule thereof, wherein at least one alcohol component constituting the ester contains an alkylene oxide having 2 to 3 carbon atoms, added in the average amount of 0.5 to 5 moles per 1 hydroxyl group, and the crystal nucleus agent is a mixture of the following crystal nucleus agent (1) and crystal nucleus agent (2);

the crystal nucleus agent (1) being the following crystal nucleus agent (1-1)

crystal nucleus agent (1-1): at least one selected from the group consisting of compounds having a hydroxyl group and an amide group in the molecule thereof; and crystal nucleus agent (2): at least one selected from the group consisting of a metal salt of phenylphosphonic acid.

2. The biodegradable resin composition according to claim 1, wherein the ratio of the crystal nucleus agent (1) to the crystal nucleus agent (2) is crystal nucleus agent (1)/crystal nucleus agent (2) (by weight)=20/80 to 80/20.

3. The biodegradable resin composition according to claim 1 or 2, wherein the crystal nucleus agent (1) is an aliphatic amide containing a hydroxyl group.

4. The biodegradable resin composition according to claim 1 or 2, wherein the plasticizer is at least one selected from the group consisting of an ester of succinic acid or adipic acid and a polyethylene glycol monomethyl ether and an ester of acetic acid and glycerin or an ethylene oxide addition product of ethylene glycol.

5. The biodegradable resin composition according to claim 1 or 2, wherein the content of the plasticizer is 5 to 30 parts by weight, the content of the crystal nucleus agent (1) is 0.1 to 3 parts by weight and the content of the crystal nucleus agent (2) is 0.1 to 3 parts by weight.

6. The biodegradable resin composition according to claim 1 or 2, which further comprises a hydrolysis inhibitor.

\* \* \* \* \*